Oct. 7, 1930.   I. A. MILLER   1,777,322
PEAVY
Filed Nov. 1, 1928
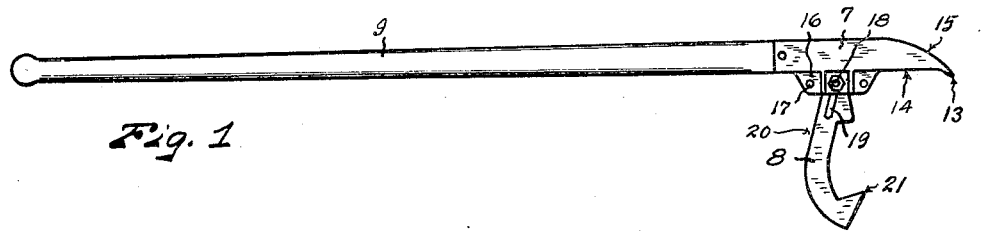
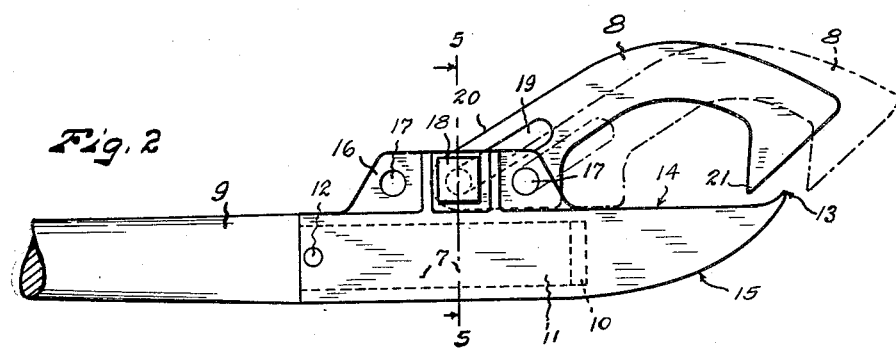
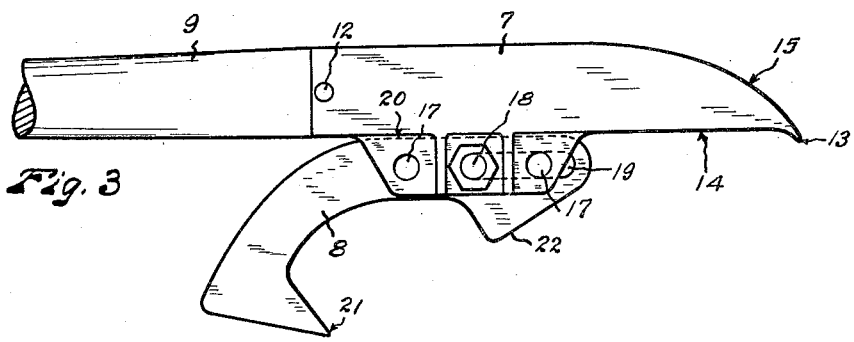
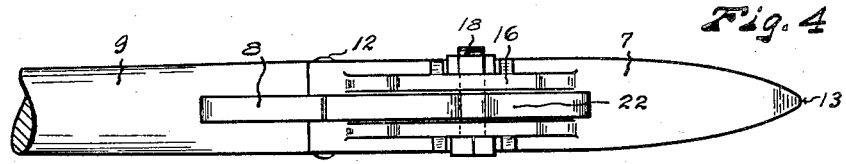
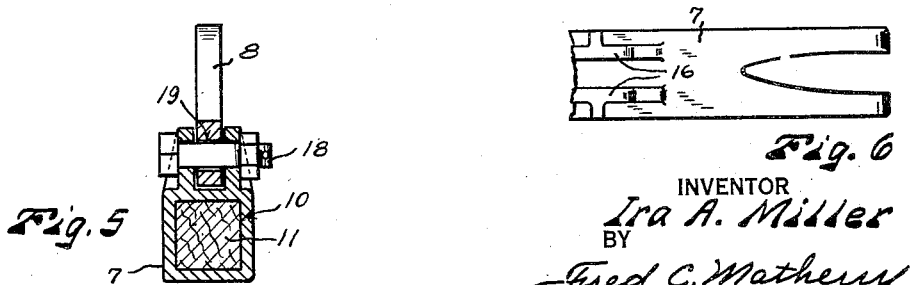
INVENTOR
Ira A. Miller
BY
Fred C. Matheny
ATTORNEY Patented Oct. 7, 1930

1,777,322

UNITED STATES PATENT OFFICE

IRA A. MILLER, OF ASHFORD, WASHINGTON

PEAVY

Application filed November 1, 1928. Serial No. 316,595.

My invention relates to improvements in peavys and the general object of my invention is to provide a peavy, of the form commonly used in handling logs and timbers, in which the hook is adjustably secured to the head portion of the peavy by a slot and pin connection in such a manner that said hook may be turned back and secured in an out of the way position when the tool is used as a pry bar or for work in which the hook is not needed.

Another object is to provide a peavy in which the base of the hook near its pivotal connection is shaped so as to engage with the head portion of the peavy and prevent the point of the hook from striking against the peavy and dulling the hook.

Further objects are to provide a peavy of this nature which is strong and simple in construction, reliable and efficient in operation, and one in which the hook may be quickly and easily adjusted or moved into an inoperative position or released for ordinary use.

Other and more specific objects will be apparent from the following description taken in connection with the accompanying drawings.

In the drawings Figure 1 is a side elevation on a reduced scale of a peavy constructed in accordance with my invention, showing the hook hanging down in a position it might assume when allowed to swing freely.

Fig. 2 is a side elevation of the peavy on a larger scale with part of the handle broken away, the hook being shown in a different position in which the point of said hook is near the body of the peavy head but is prevented from actual contact with the same.

Fig. 3 is a similar side elevation showing the hook turned back and made fast in an out of the way position.

Fig. 4 is a plan view of the device with the hook in the position shown in Fig. 3.

Fig. 5 is a cross section on line 5, 5 of Fig. 2.

Fig. 6 is a fragmentary plan view of a modified form of peavy head having a forked point adapted for pulling spikes and similar objects.

Like reference numerals designate like parts throughout the several views.

Referring to the drawings I show a peavy embodying a peavy head 7, a hook 8 pivotally secured to said head and a handle 9 upon one end of which the head is mounted. The main portion of the head 7 is preferably of rectangular cross section, see Fig. 5, with a rectangular receptacle 10 extending from one end inwardly for the reception of a rectangular portion 11 on the end of the handle 9, a rivet or screw 12 may extend crosswise through a suitable hole in the head and into the handle to prevent the head from coming off of the handle. At its outer or forward end, the peavy head terminates in a point 13 which is curved upward slightly from the plane of the side 14 of the head on which the hook 8 is pivoted, the forward end of the head being rounded off on the opposite side adjacent the point as at 15 to form a fulcrum to be used in prying.

Extending outwardly from the side 14 of the peavy head, 7 to which the hook is fastened are two spaced apart parallel flanges 16 between which the inner end of the said hook is disposed. These flanges 16 are provided with transversely aligned holes 17, preferably more than one set, for the reception of a cross bolt or pin 18 which extends through a slot 19 in the inner end of the hook. When the hook 8 is employed in the manner common to peavys it will swing freely from the pivot 18, which occupies a position in the end of the slot 19 nearest to the inner end of the hook. When the pivot 18 passes through this end of the slot 19 the hook 8 is free to swing in the usual manner and can not move lengthwise relative to said pivot except when the hook is turned back against the handle and the slot 19 is substantially parallel to the handle. To fold the hook 8 so that it will be out of the way said hook is turned back toward the handle until the slot 19 is substantially parallel to the side 14 of the peavy head and is then moved lengthwise toward the point 13 into the position shown in Fig. 2 in which the straight back edge 20 of the hook will rest against the side 14 of the peavy head and the hook will be prevented from swinging. The hook is disengaged or released from this folded or inoperative position by moving the same with the hand or by turning the point of the peavy upward and allowing the hook to drop by gravity so that the pin 18 is in the end of the slot 19 next to the inner end of the hook. The hook is not liable to be accidentally moved from one position to the other by ordinary use of the peavy but its position is very easily changed by voluntary action of the user. The fulcrum side 15 of the peavy head is opposite to the side on which the hook is secured thus placing the hook out of the way and leaving the peavy free to be used as a pry bar when the hook is folded. The outer end of the hook terminates in a point 21 while the inner end of said hook has a widened portion forming a foot 22 which is adapted to engage the side 14 of the peavy head before the point 21 of said hook strikes the peavy head and dulls said hook point.

The pivot 18 may be in the nature of a bolt with a nut on one end or it may be any other desired form of quickly and easily removable pin. To afford adjustment of the hook lengthwise of the peavy head I preferably provide three sets of the holes 17. When the pivot pin is in the middle hole the hook point 21 will be just inside the upturned peavy head point 13 as shown by full lines in Fig. 2. When said pivot pin is in the forward hole 17 the hook point 21 will be just beyond the peavy head point 13 as shown by dotted lines and when the pin 18 is in the rear holes 17 the hook point 21 will be obviously well inwardly from the peavy head point 13. This affords an ample range of adjustment for all ordinary purposes and for the usual run of logs and squared timbers or cants.

In Fig. 6 I have shown a fragment of a peavy head in which the forward end is forked or bifurcated like a nail puller to adapt the same for use in pulling railroad spikes or the like.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a peavy, a peavy head, two parallel spaced apart flanges on one side of said peavy head, a hook having its inner end disposed between said flanges and having a longitudinally extending slot in said inner end, and a pivot member extending crosswise through said flanges and said slot.

2. In a peavy a peavy head, two parallel spaced apart flanges on one side of said peavy head, a hook having one end disposed between said flanges and having a longitudinally extending slot in said end and a cross pin extending through said flanges and said slot, said hook being free to swing when said pin is in one end of said slot and being held immovable against the peavy head when said pin is in the other end of said slot.

3. In a peavy a peavy head, a hook having a longitudinally extending slot in its inner end, and pivot means extending through said slot for securing the hook to the peavy head, the hook swinging freely from the pivot means when the pivot means is at one end of said slot and being slidable on the pivot means when said hook is swung rearwardly substantially parallel to the peavy head, said pivot serving to hold said hook in retracted position except when it is in the end of said slot adjacent the inner end of said hook.

4. In a peavy a peavy head, spaced apart flanges on one side of said peavy head, said flanges having a plurality of transverse holes therein that are spaced apart longitudinally of the head to afford means for adjustment, a hook having a longitudinal slot in its inner end and a removable pivot pin arranged to extend through said slot and said holes in said flanges to pivotally and adjustably secure said hook to said flanges.

5. In a peavy a peavy head having a point on one end. a handle attached to the other end of said peavy head and extending outwardly therefrom, two spaced apart flanges on one side of said peavy head, a hook having one end disposed between said flanges and having a slot extending lengthwise thereof from near said end outwardly, and a pivot pin extending crosswise through said flanges and said slot, the inner end of said hook being rounded and the rear edge of said hook adjacent said slot being substantially straight to adapt said hook to swing freely when said pivot pin is in the end of said slot and to adapt the rear edge of said hook to lie against said peavy head when said hook is turned upwardly against the peavy head and moved longitudinally toward the point of the hook.

6. In a peavy a peavy head, hook supporting flanges on one side of said peavy head, a hook having a longitudinally extending slot adjacent its inner end, a pivot pin extending crosswise through the flanges and through the slot in said hook, whereby said hook may swing freely or may be fastened in an out of the way position and a projecting lug on said hook arranged to engage said peavy head to prevent the point of said hook from striking against said peavy head.

7. In a peavy a peavy head of rectangular cross section having a point at one end which curves outwardly from the plane of one side of said head, the opposite side of said head being rounded adjacent said point to form a fulcrum surface, a hook pivotally secured to the side of said peavy head on which said point is formed and means including a slot and pin for holding said hook in an inoperative position in which said hook is swung back against said peavy head.

The foregoing specification signed at Seattle, Wash., this 10th day of Oct., 1928.

IRA A. MILLER.